(12) United States Patent
Rohwer

(10) Patent No.: US 7,805,310 B2
(45) Date of Patent: Sep. 28, 2010

(54) APPARATUS AND METHODS FOR IMPLEMENTING VOICE ENABLING APPLICATIONS IN A CONVERGED VOICE AND DATA NETWORK ENVIRONMENT

(76) Inventor: Elizabeth A. Rohwer, 11162 Promesa Dr., San Diego, CA (US) 92124

( * ) Notice: Subject to any disclaimer, the term of this patent is extended or adjusted under 35 U.S.C. 154(b) by 0 days.

(21) Appl. No.: 10/469,110

(22) PCT Filed: Feb. 26, 2002

(86) PCT No.: PCT/US02/06133
§ 371 (c)(1),
(2), (4) Date: Aug. 25, 2003

(87) PCT Pub. No.: WO02/069325
PCT Pub. Date: Sep. 6, 2002

(65) Prior Publication Data
US 2004/0107108 A1    Jun. 3, 2004

Related U.S. Application Data

(60) Provisional application No. 60/271,468, filed on Feb. 26, 2001.

(51) Int. Cl.
G10L 21/00    (2006.01)
(52) U.S. Cl. .................. 704/270.1; 704/273
(58) Field of Classification Search .......... 704/270.1, 704/270, 273, 275, 231, 246, 247, 250; 713/186
See application file for complete search history.

(56) References Cited

U.S. PATENT DOCUMENTS

| | | | |
|---|---|---|---|
| 5,897,616 A | 4/1999 | Kanevsky et al. | |
| 5,937,381 A | 8/1999 | Huang et al. | |
| 5,960,399 A * | 9/1999 | Barclay et al. | 704/270.1 |
| 5,983,190 A | 11/1999 | Trower, II et al. | |
| 6,078,886 A | 6/2000 | Dragosh et al. | |
| 6,081,782 A | 6/2000 | Rabin | |
| 6,119,087 A | 9/2000 | Kuhn et al. | |
| 6,163,794 A | 12/2000 | Lange et al. | |
| 6,192,338 B1 | 2/2001 | Haszto et al. | |
| 6,314,402 B1 * | 11/2001 | Monaco et al. | 704/275 |
| 6,393,305 B1 * | 5/2002 | Ulvinen et al. | 455/563 |
| 6,567,775 B1 * | 5/2003 | Maali et al. | 704/231 |
| 7,054,819 B1 * | 5/2006 | Loveland | 704/273 |

* cited by examiner

Primary Examiner—Angela A Armstrong
(74) Attorney, Agent, or Firm—Cargill & Associates, PLLC; Lynn E. Cargill

(57) ABSTRACT

Human speech is transported through a voice and data converged Internet network to recognize its content, verify the identity of the speaker, or to verify the content of a spoken phrase by utilizing the Internet protocol to transmit voice packets. The voice data (4) entered is processed and transmitted in the same way as Internet data packets over converged voice and data IP networks. A voice-enabled application sends a message (5), which is decoded by the speech API (2) and the appropriate control and synchronization information is issued (7) to the data preparation module (9) and to the speech engine (3). Standard voice over IP includes a speech compression algorithm and the use of RTP (Real Time Protocol), enabling additional processing of the human voice anywhere in the network to perform speaker verification, with or without the knowledge of the speaker.

18 Claims, 1 Drawing Sheet

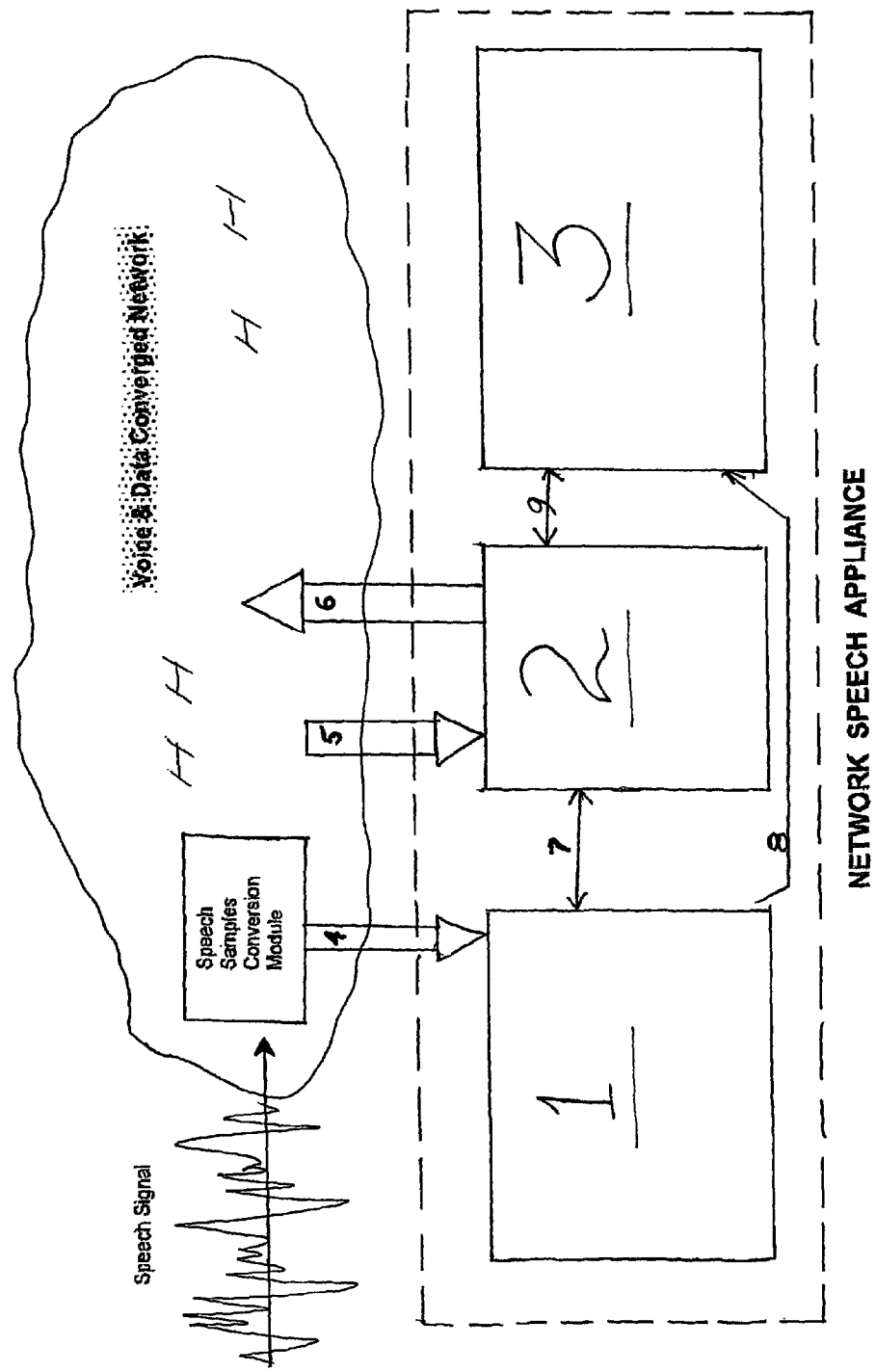

APPARATUS AND METHODS FOR IMPLEMENTING VOICE ENABLING APPLICATIONS IN A CONVERGED VOICE AND DATA NETWORK ENVIRONMENT

CROSS REFERENCES TO RELATED APPLICATIONS

This application claims the benefit of U.S. Provisional Application No. 60/271,468 filed on Feb. 26, 2001.

BACKGROUND OF THE INVENTION

The technical field of the present invention relates to a method and apparatus for implementing automatic speaker verification, speaker identification, speech recognition and spoken text verification, and more specifically relates to using the same in a converged voice and data Internet Protocol network.

In the past, voice recognition and verification has been accomplished on a limited basis for hardwired and direct comparison configurations. Other attempts have been made to provide security measures incorporating automatic speaker verification, speaker identification, speech recognition and spoken text verification. However, as the security needs of this country expand, and as customers need more and more contact with their banks, financial institutions, and other businesses to provide transactions over the Internet, it becomes clear that speaker verification and identification can be used as an important tool for carrying out those transactions. The identification of a speaker can be useful in the financial and banking industry because verification of the person speaking will enable certain transactions to proceed, whereas an imposter would be barred from carrying on any further transactions. Imposters will also be barred from receiving certain information that should only be heard by the customer.

Prior to this, some speaker verification and identification were carried out by having the customer first enter their "voiceprint" by reciting a phrase over the telephone into their databank. When the customer called back at a later date, they would say the same phrase, and it would be matched to the original "voiceprint". If it matched, then the transaction could continue. Like other hardwired, or dedicated, systems, the speaker is well aware of the match being attempted and may be able to use techniques to convince the institution that an imposter is actually the bona fide customer.

However, now with the maturing of the Internet and its wide use worldwide, a new phenomena has emerged of using the Internet Protocol (IP) to transmit voice packets and establish and maintain a telephone conversation, known as Voice over IP (VoIP). For the end user a VoIP telephone connection is perceived to be undistinguishable from the traditional Public Switched Telephone Network (PSTN) connection. However the VoIP uses a conceptually different way to transmit the human voice between two points. The voice is processed and transmitted in the same way as the Internet data packets. The convergence of voice and data IP networks allows for new methods for implementation of speech processing algorithms to emerge.

Conventional technologies include matching techniques, such as that proposed by U.S. Pat. No. 5,897,616 entitled "Apparatus and Methods for Speaker Verification/Identification/Classification Employing Non-acoustic and/or Acoustic Models and Databases" issued to Kanevsky, et al., dated Apr. 27, 1999, which discloses a process of collecting a sample of the voice of the user as a separate procedure. It is implemented as a separate telephone IVR (Interactive Voice Response) dialog with the possibility of asking additional questions and personal information from the user. The apparent goal of the '616 invention is to authorize or grant access to the legitimate user, forcing the speaker to participate in the dialog and spending additional time for this purpose.

Another example of a conventional hardwire or dedicated matching technique includes U.S. Pat. No. 5,937,381 entitled "System for Voice Verification of Telephone Transactions" issued to Huang, et al., on Aug. 10, 1999. This patent discloses a system and a method for verifying the voice of a user conducting a traditional telephone transaction. The system and method includes a mechanism for prompting the user to speak in a limited vocabulary consisting of twenty-four combinations of the words "four", "six", "seven" and "nine" arranged in a double two-digit number combination. The example uses a traditional telephone-based IVR system and also has the limitation of working with a predefined small vocabulary of password prompts. This limits its scope to operating in only one language performing a variation of text-dependent speaker verification.

Recent academic research in the field of speaker verification and speaker recognition has made an attempt to use the established ITU (International Telecom Union) compression standards used for VoIP transmission in conjunction with known algorithms for speech processing. For example in the publication "Speaker Recognition Using G.729 Speech Codec Parameters" by T. F. Quatieri, et al., ICASSP 2000, two approaches are investigated for recovering speaker recognition performance from G.729 parameter. The first is a parametric approach that makes explicit use of G.729 parameters, the second nonparametric approach uses the original MFB paradigm. In a different paper from the same conference entitled "GSM Speech Coding and Speaker Recognition" by L. Besacier, et al., ICASSP 2000, the influence of GSM speech coding on the performance of text independent speaker recognition is investigated. The three existing GSM speech codec standards were considered with results showing that by extracting the features directly from the encoded bit-stream good performance for speaker recognition can be obtained.

In yet another example of previous matching technologies, U.S. Pat. No. 6,021,387 entitled "Speech Recognition Apparatus for Consumer Electronic Application" issued to Mozer, et al., on Feb. 1, 2000, a spoken word or phrase recognition device is described. The device uses a neural net to perform the recognition task and recognizes an unknown speaker saying a digit from zero through nine with accuracy between 94-97%. The '387 patent relates to speech recognition in the context of low cost applications.

With the advent of new technologies over the Internet, these prior art technologies become lacking in being able to adapt for use in the Internet arena. The convergence of voice and data in the IP network along with the increasing role of VoIP communications indicates that the human voice will become intrinsically present in the network. This presence can be used to voice-enable new types of enhanced network applications and services.

The present invention seeks to provide an advantage over the prior art by utilizing the presence of the voice information over the Internet in new ways for voice-enabled applications. One of the objects of the present invention is to use the converged voice and data IP network for implementing automatic speaker verification, speaker identification, speech recognition and spoken text verification.

SUMMARY OF THE INVENTION

The present invention seeks to meet and exceed the above-identified objects and advantages by providing new voice-enabled applications that can be built in accordance with the presently disclosed method and apparatus. The present invention may be described as a Network Speech Appliance. The Network Speech Appliance acts as a toolbox to provide speech-processing functionality for voice-enabled applications residing in the new converged voice and data IP (Internet Protocol) based networks. The two main characteristics of the VoIP technique include a speech compression algorithm, utilizing industry standards of G.711, G.723, G.728, G.729, GSM, and others, in conjunction with the use of the RTP (Real Time Protocol) to transmit the voice audio packets over the Internet. The invention is based on the fact that through the RTP stream, the human voice is available for additional processing anywhere in the network. For instance, to perform speaker verification while the user is engaged in a VoIP telephone conversation or another voice-enabled service. This additional speech processing was not technically possible with the traditional PSTN circuit switched telephone connections.

By using the Network Speech Appliance of the present invention, speech recognition functionality can be added to voice-enabled network applications with the human voice being collected either from a telephone input and a VoIP connection or from a microphone or a computer which will perform some of the recognition functions at a overall reduced processing cost.

It is believed that one of the novel features of the present invention consists of the ability to use the computer screen and the Graphical User Interface (GUI) controlled by a WEB application to prompt the user to speak into a microphone, by reading a written text from the screen, thus entering his voice into the network for further processing. This is in direct contradistinction with the traditional IVR telephone systems used for speech recognition and speaker verification where the dialog with the end user is performed with only an audio connection.

Further in contrast to the conventional methods, the present Network Speech Appliance provides a means for using the voice of the participant in a VoIP telephone conversation to verify his identity in a manner transparent to the user without requiring extra time, hence the name for one of the applications of this method—"Non-Intrusive VoiceID Biometrics".

In carrying out the present invention, a means is described for close integration of a standard G.723 encoder module with the feature extraction block from the Network Speech Appliance to enable the desired voice enabled applications.

A method is disclosed for implementing voice-enabled applications in a converged voice and data network environment, which is begun by prompting a user to enter his human voice data into the Internet network. The speech sample is then converted into a digital format for later speech processing and the digital information is stored as a "voiceprint" for later identification and verification use. In subsequent conversations with a potential end user, hopefully the same person, new voice information is received by the Internet network as digital information is taken in by a control mechanism used to interface the network-based voice enabled application, and its stored voiceprint data, with multiple speech processing functions from a generic Speech API (Application Interface). One or more speech processing functions are performed using the voice of the current speaker, and the current "voiceprint" can be processed transparently to the stored previous voiceprint from the first entry. In most of the present embodiments, the speaker is unaware that such a match is taking place. This transparency of action alleviates the need for remembering passwords, and prevents the usage of pre-recorded voices used to gain access to customer sensitive information. After the match of the voiceprints has taken place, then the processor may take an action to award or penalize the user depending on the desired result, or it may be used to provide feedback to the end user to communicate the result. Either way, an end user may be allowed to enter, or may be barred from entering, further Internet applications.

The step of entering the human voice can be performed in a number of ways more fully described below. As well, more complete descriptions of the control mechanism, the speech processing functions, and the user feedback are also given along with the components of the Network Speech Appliance and the voiceprint recognition.

Therefore, in accordance with the present invention, the objects and advantages of the present invention have been met. The invention will be described more fully hereinbelow in conjunction with the appendant drawing.

BRIEF DESCRIPTION OF THE DRAWING

FIG. 1 is a schematic illustration of the processing of the voice over IP data packets, and the basic structure of the voice enabled applications made possible by the present invention.

DETAILED DESCRIPTION OF THE INVENTION

The present invention will be discussed in the context of the inventor's Network Speech Appliance which uses human speech transported through the new emerging type of voice and data converged networks, to recognize its content, or to verify the identity of the speaker and/or the content of a spoken phrase. The recognition or the verification result is then used to take an action affecting the voice or a data transaction over the network.

The invention presents a new method of implementing speech recognition and speaker verification for voice enabled applications in a network environment. The Network Speech Appliance is a module whose core functionality is to perform speech-processing functions such as speech recognition and speaker verification, implemented under the same Speech API as a state machine controlled by a voice enabled network application. The voice speech data needed for the speech processing algorithms is collected real time from the voice audio stream transported by the network. The audio data stream may be in the Internet Protocol (IP) network as Voice over IP packets, or may come from other inputs as described below. The Network Speech Appliance can be implemented as a software host based module or with dedicated hardware using the same principle.

The Network Speech Appliance makes it possible to implement a new range of voice applications. One such example from the class of non-intrusive voice ID biometrics and spoken text verification is the following security application. If the speech signal does not belong to the voice of the legitimate subscriber to a telephone or another voice enabled Internet service, an action will be taken to prevent the speaker from using the service or stopping his telephone conversation. In other cases, if the authentication is positive, the action taken could be to grant a benefit or reward to the legitimate user. In this example the main activity of the user is voice access to the network for a specific purpose. Verifying his identity with the Network Speech Appliance is a background procedure performed concurrently, in a way that could be made transparent to the user.

Voice ID verification is a procedure, which acknowledges the authenticity of a speaker, based on the characteristics of his voice. Voice ID verification belongs to a class using intrinsic, physiological characteristics, called biometrics. The voice ID verification process includes processing a sample of speech, training a voiceprint to summarize the vocal specifics, when the speaker is newly enrolled, and comparing the stored voiceprint of the claimed identity with a sample of the speech of the speaker. If the match is close enough, the claimed identity is accepted. When the speech sample to verify the user is obtained from a telephone conversation or another voice activated application the voice ID verification process is non-intrusive, as the speaker does not know that his voiceprint is being matched to an earlier sample. This saves time and is more convenient for the speaker, as he will not have to remember and repeat the password phrase.

Spoken text verification is a process that acknowledges that the text of a spoken sentence or the sequence of the pronounced words is an exact match to a prompted phrase that the speaker is asked to say. This represents a particular custom case of speech recognition and can be used separately or in conjunction with voice ID verification.

The term "non-intrusive spoken text verification" is used to indicate that certain applications that use the invention have a non-intrusive character. One such example is "an active advertising" application, described bellow, where for the first time the customer has the choice to actively participate in the advertising process in a way never done before.

The present Network Speech Appliance and its use for non-intrusive voice ID biometrics and spoken text verification applications offer a set of novel features. It can be used to enhance an array of voice-enabled services provided by Internet and/or telephone applications.

Up until now, known deployments of speaker verification have required the speaker to say a predefined or prompted password phrase in a separate IVR (Interactive Voice Response) dialog. This adds extra time to the service, causes inconvenience for the user (in some cases he is required to remember his verification password together with a PIN number), and has limited verification accuracy and requires additional computational resources. In contrast, the present non-intrusive voice ID biometrics uses the voice input from a person accessing the network for a voice-related service without adding additional load to the consumer. His voice is already present in the network for the purpose of using the service. The present non-intrusive voice ID verification processes the same voice data in a way transparent to the user, thus adding convenience and increased security to the application.

The implementation of the non-intrusive voice ID biometrics as an integral part of a standard speech processing module for existing network applications involves a method of seamless integration with the new emerging standards for voice data processing used in voice-activated applications and telecommunication services. For instance, the new types of telephone services use a universally accepted set of compression algorithms, such as G.723 (or G.728, G.729) for Voice over IP (VoIP), or GSM for mobile communications. The present invention describes how to implement the non-intrusive voice ID biometrics as a concurrent module that has as an input data already partly processed by the G.723 encoder. This innovation greatly facilitates the use of computer resources.

In addition, this characteristic brings the invention to the rank of international standards which, if proposed and accepted by the ITU commission, could have tremendous business benefits and consequences. As an example, the invention can be part of the processing module of a cellular telephone and the verification result will confirm the current user as the legitimate owner of the device.

The deployment of the non-intrusive voice ID biometrics adds new type of increased security to network applications as it processes the voice sample of the user while he is performing another voice activity over the network, such as carrying on a telephone conversation, for instance. The application using the invention can be designed either to indicate or not, to the user, that his voice is being used simultaneously for the purpose of verifying his identity. In the latter case the user will not be aware if a voice ID verification process is taking place. Thus he will not be able to change his voice or manner of speaking to pose as an imposter or use a prerecorded tape with the voice and password of the legitimate owner, to break the system. This eliminates two big disadvantages that make the currently known voice verification systems prone to abuse.

An apparatus for implementing a message-based mechanism communicates between a speech application interface and a voice-enabled application by a command message being sent from the voice-enabled application to the speech application interface and contains information about the type of operation that the Network Speech Appliance is asked to perform. A corresponding response message returns to the application as a result of the operation that the Network Speech Appliance was asked to perform. Each message may contain an indication of whether it is a command or a response message. Each message may also contain an optional parameter list needed to perform the operation, or returned as a result of the operation. Furthermore, each message may contain an optional data block needed to perform the operation, or returned as a result from the speech processing, while number of command messages defines the number of the states in the Speech API state machine, which corresponds to the different speech processing functions of the Network Speech Appliance.

The above described voice-enabled network application may use the Network Speech Appliance for non-intrusive voice ID biometrics in the following manner. The user enters his voice into the network for the purpose of performing a VoIP telephone conversation and the Network Speech Appliance uses a sample of the telephone conversation to verify or identify the user in a manner transparent to the user. The voice-enabled network application may also use the Network Speech Appliance for Speech Recognition when the user enters his voice into the network through a VoIP connection for the purpose of accessing information or a service using speech recognition.

The voice-enabled network application may also use the Network Speech Appliance as the dialog with the user is performed via the computer screen with written messages and instructions from the voice-enabled network application to which the user replies using his voice, or the voice of the user is may be part of a VoIP telephone conversation or an Interactive Voice Response (IVR) system with speech recognition if the dialog is performed with acoustic feedback. In yet another embodiment, the Network Speech Appliance may be used if the computer screen prompts the user to speak an advertising phrase and the Network Speech Appliance performs spoken text verification and simultaneously verifies the user identity through non-intrusive voice ID biometrics. The prompted advertising phrase may be heard from a telephone headset and the voice of the user is transported through VoIP packets and the RTP audio stream.

The voice-enabled network application may also use the Network Speech Appliance to perform non-intrusive voice ID biometrics simultaneously to more than one speaker participating in a conference call. The action taken by the application will be to indicate who is currently speaking by highlighting a reference to him on a monitoring WEB site. In still another application, or embodiment, non-intrusive voice ID biometrics may be performed in order to differentiate the voices of the users of a flat rate long distance VoIP telephone service and allow usage only by the legitimate subscriber, or the voice ID biometrics to secure access to services over the Internet.

Furthermore, another increased security feature comes from the fact that the non-intrusive voice ID biometrics has the potential to use a sufficiently long-time sample of the Voice of the user to ensure a reliable verification result. Because it is non-intrusive, the voice ID verification process can use the data from, or "listen" to, a given voice from a telephone conversation, for instance, for as long as it is needed to determine with a high confidence level the claimed identity. This is in contrast to the currently known speaker verification systems. The speech material used for verification always has the limited duration of the prompted or known password phrase, which causes the verification to have suboptimal performance in some cases as the password may not be long enough for a positive verification.

Moreover, the present invention allows new types of voice-activated applications to be designed and used for different purposes, other than the traditional voice security or monitoring applications. The currently known speaker verification applications are being performed as a separate process that is controlled by a specifically designed IVR module. In contrast the non-intrusive voice ID biometrics is a complementary process that runs concurrently with another speech processing module, which defines the main purpose of the application. This allows for a range of new voice activated applications to be designed and built using the invention, which is believed to have not been technologically possible up until now.

Having described the general capabilities of the present invention, we now turn to some individually specific applications, which find great industrial utility. The following paragraphs will be individually described until separate headings, relating to each of the specific applications. Although this listing of applications is representative of the present invention, it is not intended to be all-inclusive, and shall not limit the scope of the invention.

A. Non-Intrusive Active Advertising

In this application, the invention can be used in the following manner. The user will be prompted to say a phrase chosen at random from a list of catch phrases, that advertisers use to make the public remember their products, such as: "American Airlines. Something Special to the Sun". If the speaker repeats the phrase correctly, the action taken will be to register a reward or benefit of some sort, supplied by the advertiser, such as free minutes added to a telephone conversation or any other reward that is offered.

This voice-activated application is based upon a spoken text verification processing module and defines the main functionality. The non-intrusive voice ID biometrics is a concurrent process in the background, which confirms the identity of the speaker and links the gained benefit points to his record. This combination makes it possible to credit the right account and to ensure that the same speaker's voice is not claiming all the credit provided by the advertiser. As a special case, if the benefit from the advertiser can be defined as an immediate action, the spoken text verification can be used without the non-intrusive voice ID biometrics module. For instance, if the reward is long distance telephone time, the user can be asked if he wishes to get free minutes in exchange for participation in the active advertising application. In this case, after correctly repeating the advertiser's catch phrase the user will be allowed to make a free long distance telephone call immediately following the IVR dialog.

Another example for a voice enabled application using the speech recognition functionality from the Network Speech Appliance is a multiple choice quiz where the correct answer to a question is awarded with a product discount or extra quantity. The main application in this case can be a voice-enabled IVR order for a purchase.

B. Real-time Speaker Spotting in Conference Call Applications

Real-time speaker spotting in conference call applications is an example of how the invention can be used in WEB monitored conference calls or video conferencing applications. Often, when the number of persons participating in a conference call is more than three, it is difficult to follow who is the current speaker, because the voices sound similar. The non-intrusive voice ID biometrics can be used to indicate in real time the identity or the picture of the person talking in any particular moment. In this scenario the main voice application is the WEB monitored conference call. The number of active Network Speech Appliances performing non-intrusive voice biometrics in the background corresponds to the number of conference call participants. The action taken upon the verification result from each Appliance is to highlight the graphical presentation of the currently talking participant on the monitoring WEB site.

C. Individual Subscriber Flat Rate Telephone Service for VoIP Calls

In the emerging market for long distance domestic VoIP calls the service providers often offer a flat monthly rate for an unlimited telephone time per subscription. This implies that, if the subscriber loses or intentionally discloses his PIN number, anyone can have unlimited access to use the service through his account, which will have financial consequences for the provider. With integrated non-intrusive voice ID biometrics, the service may only be allowed to only one person, the legitimate subscriber, or to his friends and family may be allowed, for an additional fee, to use the Network Speech Appliances for each one of the individual voices. Thus the invention offers to the service provider a new way to control usage of the accounts for long distance VoIP calls and to achieve a more flexible pricing policy.

D. Cellular Phone-Wireless Device Ownership Protection

Cellular telephones now have increased functionality in many cases as wireless Internet access devices. If stolen or lost, private information about the owner could be misused. The non-intrusive voice ID biometrics can be implemented as a security feature on the cellular phone, checking the voice of the legitimate owner while he is using the device. In this case, some of the speech processing functions of the Network Speech Appliance can be implemented on the device itself. The action taken by the network application will be to allow, or prevent, the voice or data connection to be established between the device and the network.

E. Voice Security for Internet Based Applications

Voice ID Biometrics can be used to add a level of security and ensure that a person who enters a PIN number to access an Internet based service is the authorized person to do so. Currently there are situations, for example when access to information over the Internet is sold as a subscription based service, when the PIN number of a legitimate subscriber is given away and used by several other people. A voice-enabled Internet application can verify that the person who enters the PIN number has the voice characteristics of the legitimate subscriber and thus prevent fraudulent use by unauthorized people. In this case a Graphical User Interface (GUI) will prompt the user to read text displayed on the screen of his computer. A microphone and a sound card, or an USB device will collect his voice and the Network Speech Appliance will accept or reject the claimed identity using voice ID verification. The action taken will be to deliver (or refuse) the Internet based service to the legitimate subscriber. In this case the dialog with the end user is performed through the computer screen not through a traditional IVR system. The text message displayed on the computer screen can vary with each prompt and can be combined with the phrase used for the active advertising application as explained above.

F. Implementation of the Network Speech Appliance

FIG. 1 shows the implementation of the Network Speech Appliance and describes its use for the new class of non-intrusive voice ID biometrics and spoken text verification applications, as well as the traditional cases of speech recognition and speaker verification.

The speech signal enters the voice and data converged network and gets processed by a speech samples conversion module. The operation performed by this module can be as simple as a standard AD conversion or may act to operate more complex functions, such as compression and packetisation used by the VoIP gateways, IP phones or Internet Access Devices (IAD).

The voice data is generally referred to by the numeral 4, and is shown as being passed to the Network Speech Appliance for processing. This data can be in the form of raw speech data (standard PCM); or IP packets derived from the RTP data stream, which may contain compressed voice data as described by the industry ITU-T standards G.711, G.721, G.723, G.726, G.727, G.728, and G.729. In some cases, such as the CELP-based types of compression—G.723, G.727, G.728, GSM, it is also possible to integrate the Network Speech Appliance more closely with the encoder module. As an example, the discussion above cites integration with G.723.1 compression.

The Network Speech Appliance has three main modules: a data preparation module; a speech API for control and synchronization; and a speech engine for recognition and verification. The data preparation module is indicated by the numeral 1, and is shown buffering the voice data 4 in frames long enough for front end processing of the data, along with the voice features extraction procedures. The typical length of the speech frame is 30 milliseconds, generally with an overlap between consecutive frames of 10 milliseconds. The front-end processing can include an end point detection scheme, or may include a voice/noise detection implemented in real time. The voice features extraction block implements speech signal processing algorithms such as the ones described in the following literature articles, both incorporated herein by reference, of George Velius, "Variants of Cepstrum Based Speaker Identity Verification", Proceedings of ICASSP 88, pp. 583-586, 1988; and H. Hermanski, et al., "RASTA-PLP Speech Analysis Technique", Proceedings of ICASSP 92, pp. I.121-I.124, March 1992.

In the event that close integration with the G.723.1 compression is utilized, the voice/noise detection may be performed by the encoder with the result returned in the Ftyp field in the compressed frame and the result from the voice features extraction block may then become the output data array UnqLpc[SubFrames*LpcOrder] returned by the encoder function Comp_Lpc(UnqLpc, CodStat.PrevDat, DataBuff), as described in the ITU-I Recommendation G.723.1 document, "ITU-T General Aspects of Digital Transmission Systems, ITU-T Recommendation G.723.1, Dual Rate Speech Coder for Multimedia Communications transmitting at 5.3 and 6.3 kbit/second.

The data preparation module receives control and synchronization information 7 from the speech API module 2 and outputs processed data 8 to the speech engine in real time. These data can be Cepstral Coefficients, Mel Cepstra, Rasta PLP and/or variations of the above depending on the algorithms implemented in the speech engine. Meanwhile, the speech API 2 interfaces the network voice-enabled application and provides control and synchronization information sources 7 and 9 to the data preparation module and the speech engine. It may be implemented as a state machine and communicates with the voice-enabled application by receiving a command message 5 and sending back the appropriate response message. Each message contains several types of information. First, the message contains information about the type of the operation the Network Speech Appliance is asked to perform. Secondly, an indication is needed of whether this is a command or a response message. Third, an optional parameter list is needed for the operation to be performed, or a parameter list is returned by the Appliance as a result. In addition, an optional data field can be included as part of the message, if data exchange is needed. The communication mechanism is preferably performed through one of the standard network protocols such as TCP/IP.

The number of command messages defines the number of states of the speech API, which corresponds to the different functions of the Network Speech Appliance. For instance, there is a group of messages to make the speech appliance perform voice ID verification. Within those there are separate messages to collect voice data for training, train a voiceprint, and perform voice ID verification. A separate group of messages will invoke the speech engine to perform speech recognition. Within those messages, there are separate messages to initialize the speech recognizer, set the active vocabulary, perform speech recognition, as well as others. A different group of messages will make the speech engine operate in text verification mode.

The voice-enabled application sends a message 5, which is decoded by the speech API and the appropriate control and synchronization information is issued 7 to the data preparation module and 9 to the speech engine. In addition, 7 and 9 may transfer data back to the speech API that could then be returned to the application. An example is the voiceprint data, which is produced and used by the speech engine, possibly to be stored in the Network by the application.

The speech engine performs the function as instructed by the command message on the processed data 8 and returns a result, which is then passed, back to the application by the speech API as a return message. The return message 6 contains information about the successful completion of the operation with a result such as the recognized word or a positive verification. Or if an error has occurred, the error condition, which can be due to an unexpected behavior of the speaker, such as remaining silent for a long period of time. The application then can use this information to correct the situation, or if the operation has been completed successfully, to perform an action that will affect the network voice or data transaction.

The speech engine implements algorithms for speech recognition, speaker verification or speaker identification as described in the literature articles by N. Morgan and H. A. Bourland entitled "Connectionist Speech Recognition: A Hybrid Approach", Kluwer Academic Publishers, 1994; by Yong Gu and Trevor Thomas entitled "A Hybrid Score Measurements For HMM—based Speaker Verification", Proc. of ICASSP 99, pp. 371-320, 1999; by Robert E. Bogner entitled "On Talker Verification Via Orthogonal Parameters", IEEE Transactions on Acoustics Speech, and Signal Processing, Vol. ASSP-29, No. 1, February 1981; and by N. Morgan, et al., entitled "Continuous Speech Recognition Using PLP Analysis with Multilayer Perceptrons", ICASSP, pp. 49-52, 1991, all articles being incorporated herein by reference. Its main functional modules include the following: voice ID verification, voice print train, speech recognition and spoken text verification, and they are activated upon decoding of the appropriate message received by the speech API. Each one of these main modules can have several modes of operation, which are chosen and activated by the same message mechanism. The total number of messages to control and communicate with the Network Speech Appliance corresponds to the total number of modes of operations for all of the modules performing the main functions of the speech engine block. This number can vary depending on the chosen functional complexity of the implementation.

Upon successful completion of the operation the speech engine returns a result 9, which may or may not contain an additional data field. This information is then used by the speech API to construct the response message and communicate it back to the application. In addition there are special messages to control the Speech Appliance in non-trivial situations. As an example, consider the following scenario: the Speech Appliance is required to perform speech recognition with barge-in and the barge-in is allowed to be either by voice or through DTMF. The application will issue the appropriate control message to start the Speech Recognition with barge-in functionality enabled. If instead of speaking the user presses a DTMF to barge in, then the recognizer has to be stopped before any recognition result is available and reinitialized properly to wait for the next operation. The software architecture and control mechanism described accounts for those situations.

The following are a few examples regarding the use of the Network Speech Appliance for some of the non-intrusive voice ID biometrics and spoken text verification class of applications, described earlier.

The non-intrusive active advertising application will issue a command message to the Network Speech Appliance, which will activate the text verification module, and send an attached data block, to indicate which is the text to be verified. The data preparation module implements in real-time the algorithm described in the Velius reference, supra, and the text verification module implements a variation of speech recognition as described in an article by Hiroaki Sakoe and Seibi Chiba entitled "Dynamic Programming Algorithm Optimization for Spoken Word Recognition", IEEE ASSP, vol. ASSP-26, pp. 43-49, February 1978, incorporated herein by reference. To add non-intrusive voice ID biometrics functionality, the application will send a command message to the Speech Appliance to activate the voice ID verification module from the speech engine. This message contains the Voice Print information for the verified user in the data field. The data preparation module implements in real-time the same algorithm as described in literature article by George Velius, supra, and the voice ID verification module performs a text-independent speaker verification algorithm such as the one described in an article by Robert E. Bogner entitled "On Talker verification Via Orthogonal Parameters", IEEE Transactions on Acoustics, Speech and Signal Processing, Vol. ASSP-29, No. 1, February 1981, also incorporated herein by reference.

The voiceprint of the user must be previously trained by the Network Speech Appliance. This is achieved by the application sending a sequence of command messages to collect the voice data from a new subscriber and activate the voice print train module to compute the voiceprint. The result from a successful training session is returned in the data field of the response message and stored by the application. The traditional speech recognition functionality can be invoked by a command message that activates the Speech Recognition module. In this case the algorithms implemented could be the one described in the scientific journal article by H. Hermanski, et al., supra, for the data preparation module and the connectionist HMM approach as described in a scientific journal article by N. Morgan and H. A. Bourlard entitled "Connectionist Speech Recognition: A Hybrid Approach" by Kluwer Academic Publishers, 1994, also incorporated herein by reference, for the speech engine module.

Combining different sequences of command messages to control the Network Speech Appliance provides many different applications that can be constructed to provide new innovative features and a wide range of applicability.

Although the above invention has been described in detail, the scope of the invention is only to be limited by the appendant claims. The examples disclosed are illustrative of the invention, with other embodiments obvious to those of ordinary skill in the art.

INDUSTRIAL APPLICABILITY

The present invention finds industrial applicability in the telecommunications industry, and finds particular applicability in the voice over Internet protocol industry.

What is claimed is:

1. A method of implementing voice-enabled applications in a single converged voice and data network IP environment that supports and implements VoIP connections, protocols and traffic, the method comprising:

a. entering human voice data as data packets into a converged VoIP packet-switched IP based voice and data network;

b. converting the voice data into a digital format for VoIP transport and speech processing at a later time;

c. providing a control mechanism to interface at least one packet-switched network voice enabled application with at least one speech processing function using a VoIP speech application interface;

d. performing at least one speech processing biometrics function inside the VoIP network using the voice of the end user, wherein the voice-enabled application performs non-intrusive voice ID biometrics during which the user enters his voice into the network for the purpose of performing a VoIP telephone conversation and a sample from the voice of the telephone conversation is used to verify the user in a manner transparent to the user; and e. taking an action with respect to the end user depending on the result from the speech processing of the voice data, said action being taken from the group consisting of allowing the end user to enter into a secured transaction, awarding the end user with a prize, penalizing the end user by disallowing entry, and providing feedback to the end user to communicate the result.

2. A method of implementing voice-enabled applications in a single converged voice and data network IP environment that supports and implements VoIP connections, protocols and traffic, the method comprising:

a. entering human voice data as data packets into a converged VoIP packet-switched IP based voice and data network;

b. converting the voice data into a digital format for VoIP transport and speech processing at a later time;

c. providing a control mechanism to interface at least one packet-switched network voice enabled application with at least one speech processing function using a VoIP speech application interface;

d. performing at least one speech processing biometrics function inside the VoIP network using the voice of the end user;

wherein the voice-enabled application residing in a packet-switched IP based network for VoIP traffic performs spoken text verification without an intrusive response, where the computer screen prompts the user to speak an advertising phrase and the voice enters the network through the computer without passing through a PSTN network; and e. taking an action with respect to the end user depending on the result from the speech processing of the voice data, said action being taken from the group consisting of allowing the end user to enter into a secured transaction, awarding the end user with a prize, penalizing the end user by disallowing entry, and providing feedback to the end user to communicate the result.

3. A method of implementing voice-enabled applications in a single converged voice and data network IP environment that supports and implements VoIP connections, protocols and traffic, the method comprising:

a. entering human voice data as data packets into a converged VoIP packet-switched IP based voice and data network;

b. converting the voice data into a digital format for VoIP transport and speech processing at a later time;

c. providing a control mechanism to interface at least one packet-switched network voice enabled application with at least one speech processing function using a VoIP speech application interface;

d. performing at least one speech processing biometrics function inside the VoIP network using the voice of the end user, wherein the voice-enabled application residing in a packet-switched IP based network for VoIP traffic performs spoken text verification where the computer screen prompts the user to speak an advertising phrase while simultaneously verifying the user's identity through non-intrusive voice ID biometrics, and the voice enters the network through the computer without passing through a PSTN network; and e. taking an action with respect to the end user depending on the result from the speech processing of the voice data, said action being taken from the group consisting of allowing the end user to enter into a secured transaction, awarding the end user with a prize, penalizing the end user by disallowing entry, and providing feedback to the end user to communicate the result.

4. A method of implementing voice-enabled applications in a single converged voice and data network IP environment that supports and implements VoIP connections, protocols and traffic, the method comprising:

a. entering human voice data as data packets into a converged VoIP packet-switched IP based voice and data network;

b. converting the voice data into a digital format for VoIP transport and speech processing at a later time;

c. providing a control mechanism to interface at least one packet-switched network voice enabled application with at least one speech processing function using a VoIP speech application interface;

d. performing at least one speech processing biometrics function inside the VoIP network using the voice of the end user, wherein the voice-enabled application residing in a packet-switched IP based network for VoIP traffic performs non-intrusive voice ID biometrics simultaneously to more than one speaker participating in a conference call and indicates who is currently speaking by highlighting a reference to him on a monitoring WEB site; and e. taking an action with respect to the end user depending on the result from the speech processing of the voice data, said action being taken from the group consisting of allowing the end user to enter into a secured transaction, awarding the end user with a prize, penalizing the end user by disallowing entry, and providing feedback to the end user to communicate the result.

5. A method of implementing voice-enabled applications in a single converged voice and data network IP environment that supports and implements VoIP connections, protocols and traffic, the method comprising:

a. entering human voice data as data packets into a converged VoIP packet-switched IP based voice and data network;

b. converting the voice data into a digital format for VoIP transport and speech processing at a later time;

c. providing a control mechanism to interface at least one packet-switched network voice enabled application with at least one speech processing function using a VoIP speech application interface;

d. performing at least one speech processing biometrics function inside the VoIP network using the voice of the end user, wherein the voice-enabled application residing in a packet-switched IP based network for VoIP traffic performs non-intrusive voice ID biometrics in order to differentiate the voices of the users of a flat rate long distance VoIP telephone service and allow usage-only by the legitimate subscriber; and e. taking an action with respect to the end user depending on the result from the speech processing of the voice data, said action being taken from the group consisting of allowing the end user to enter into a secured transaction, awarding the end user with a prize, penalizing the end user by disallowing entry, and providing feedback to the end user to communicate the result.

6. A method of implementing voice-enabled applications in a converged voice and data network IP environment that supports and implements VoIP connections, protocols and traffic, comprising:

a. entering human voice data as data packets from a speaker into a converged VoIP voice and data packet-switched IP based network for later processing and acoustic matching;
b. non-intrusively processing the voice data from an end user biometrically while the end user is speaking into the converged VoIP voice and data packet-switched IP based network;
c. preparing the voice data for VoIP speech processing function with a front-end processing module to separate the pauses in the speech from the voice data and utilizing a voice feature extraction module to ready the speech for a processing algorithm from a speech engine;
d. synchronizing generated control information with a data exchange between a data preparation module and the speech engine through a speech application interface;
e. processing the voice features by the speech engine to perform at least one combination of the speech processing and pattern recognition algorithms implemented by the speech engine;
f. providing feedback to the end user to communicate the result from the speech processing; and
g. taking an action responsive to the result from the processing of the voice.

7. The method of claim 6, wherein the human voice is entered by a data preparation module implemented on a buffering device selected from the group consisting of a computer and a specialized hardware, for buffering the data and passing it directly to the data preparation module without transmission over the conventional telephone network and a speech engine implemented as a part of a centralized server.

8. The method of claim 6, further comprising the implementation of a network speech appliance on the buffering device with the speech application interface communicating with the voice-enabled application on the packet-switched IP based VoIP network using a message-based mechanism.

9. The method of claim 6, further comprising the implementation of the network speech appliance on a wireless device with the speech application interface communicating with the voice-enabled application on the packet-switched IP based VoIP network using the message-based mechanism without the voice passing through the conventional telephone network.

10. The method of claim 6, wherein said step of taking an action responsive to the result from the processing of the voice, further comprising:
h. entering into a dialog with the end user with the aim of acquiring additional voice data from the user, in the case when the first voice data entry does not secure sufficient accuracy from the speech processing algorithms;
i. entering into a dialog with the end user with the aim of acquiring additional voice data from the user in order to perform additional speech processing using a different algorithm from the speech engine for a separate purpose;
j. indicating to the user the result of the VoIP speech processing operation; and
k. repeating the above instant steps if the voice enabled application requires it.

11. The method of claim 6, wherein the step of providing the feedback to the end user is accomplished by using a graphical interface on a screen of a device selected from the group consisting of a computer, a mobile phone, a personal handheld device and a specialized hardware, said graphical interface displaying written messages as prompts and results from the speech processing operation.

12. The method of claim 6, wherein the step of providing the feedback to the end user is accomplished by using audio feedback by playing the dialog messages to the end user over a telephone device without the voice passing through the conventional telephone network.

13. The method of claim 6, wherein the step of providing the feedback to the end user is accomplished by using a combination of a graphical interface from a computer screen with an audio feedback from a VoIP telephone connection with the audio passing through the computer.

14. The method of claim 6, wherein said step of processing the voice features by the speech engine is accomplished by performing a function of training a voiceprint for a new user.

15. The method of claim 14, wherein a combination of the steps can be implemented simultaneously using the same sample of the voice of the user by performing voice ID verification on a prompted text that varies with each prompt and simultaneously performing spoken text verification to ensure the end user is saying the asked-for sequence of words.

16. The method of claim 6, wherein said step of processing the voice features by the speech engine is accomplished by performing a function of voice ID verification of an enrolled user.

17. The method of claim 6, wherein said step of processing the voice features by the speech engine is accomplished by performing a function of speech recognition.

18. The method of claim 6, wherein said step of processing the voice features by the speech engine is accomplished by performing a function of spoken text verification.

* * * * *